United States Patent Office 3,429,470
Patented Feb. 25, 1969

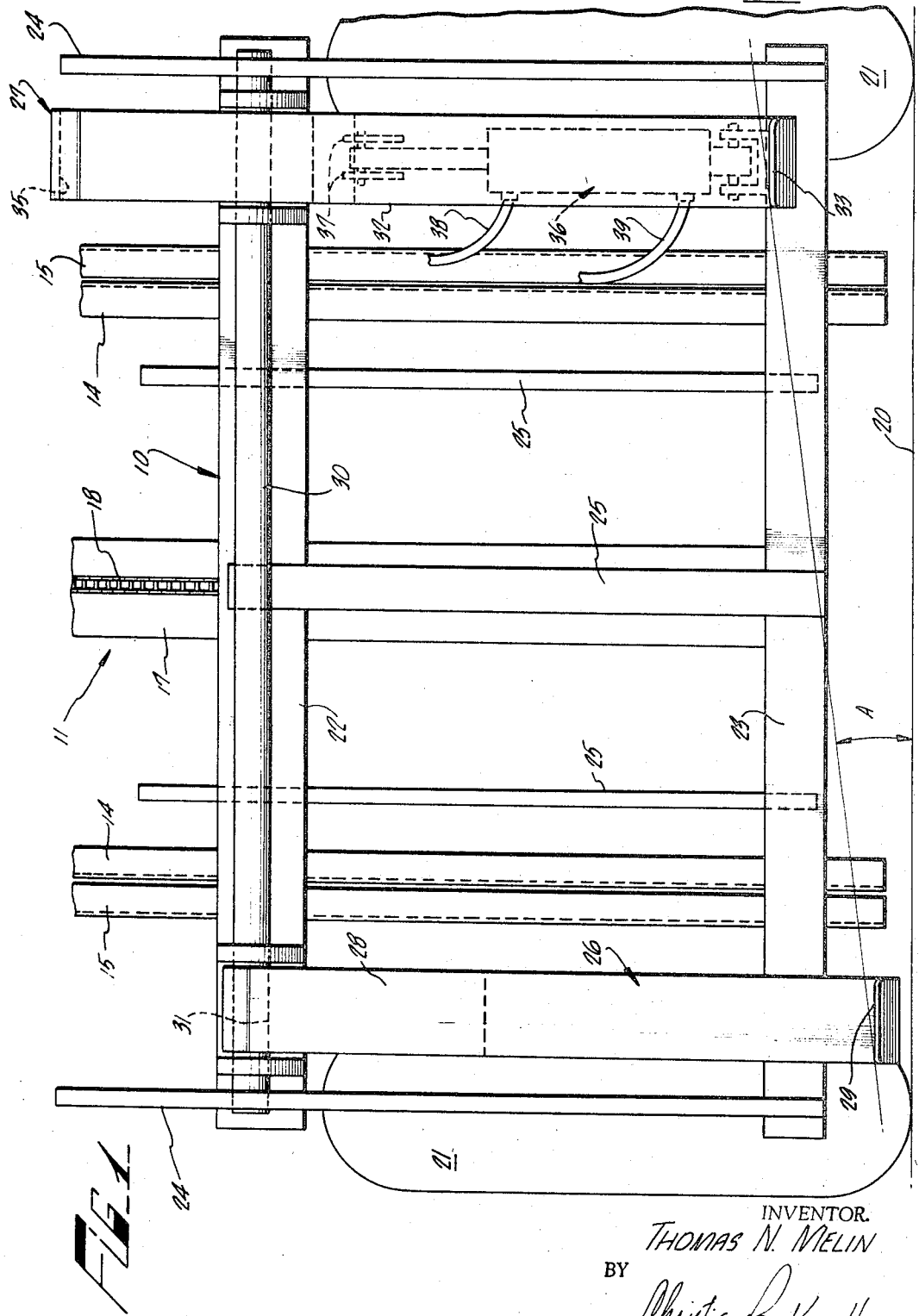

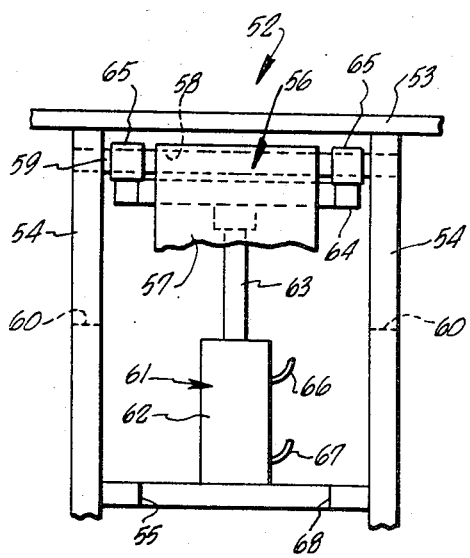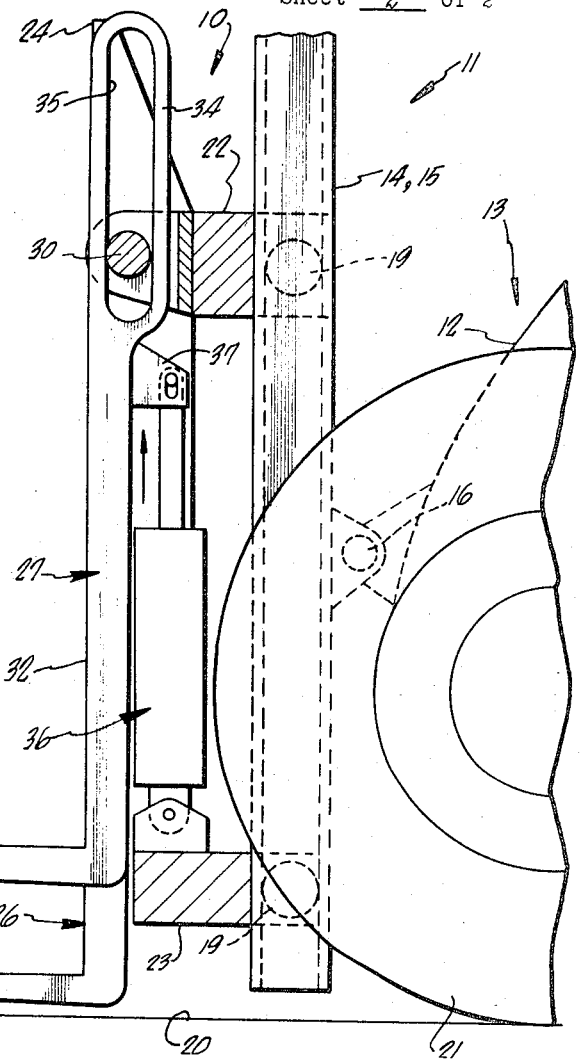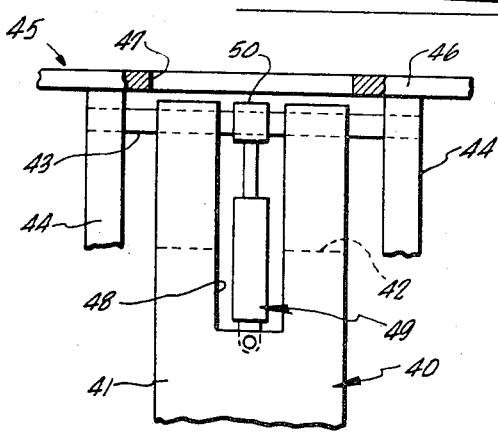

3,429,470
LOAD HANDLING IN FORK-LIFT TRUCKS
Thomas N. Melin, 5538 The Toledo-Naples,
Long Beach, Calif.
Filed Mar. 15, 1965, Ser. No. 439,846
U.S. Cl. 214—750                    3 Claims
Int. Cl. B66f 9/06, 9/16

ABSTRACT OF THE DISCLOSURE

A slope piling arrangement for a fork-lift truck in which one of the lifting forks has its vertical leg movably engaged with a hanger bar secured to the fork apron so that the fork leg, during movement relative to the apron, is constrained to move vertically, and in which a power drive mechanism is connected between the apron and the fork for moving the fork relative to the apron.

---

This invention relates to fork-lift trucks. More particularly, it relates to apparatus adjustably interconnecting the lifting forks of fork-lift trucks with the fork apron so that a load carried on the forks may be lifted from or deposited on load receiving means angled out of the horizontal with respect to the truck chassis.

In load handling with fork lift trucks, the load is supported on a pair of forks which extend forwardly from a vertically movable apron mounted to the front end of the vehicle. Usually the load is lifted from or deposited on a foundation or the like defining a load receiving plane parallel to the surface which supports the truck. Often, however, the surface upon which the load is to be deposited, or from which the load is to be lifted, is not parallel to the floor or other surface which supports the truck. In such cases, the forks cannot be engaged with the load without damaging the load and/or the truck, or the load cannot be deposited without damage to the truck, to the load, or to the load receiving structure.

This invention provides simple, effective and economic apparatus which adjustably interconnects at least one of the forks of a fork lift truck to the fork apron for vertical movement of the fork relative to the apron and relative to the other fork. Existing trucks can be modified to receive this apparatus. Moreover, the apparatus can be incorporated readily into the design of a truck during manufacture of the truck. The apparatus has the feature that its use does not increase the "offset" of the truck, thereby assuring that the load handling capacity of the truck is essentially undiminished. The "offset" of a fork lift truck is the distance between the center of the front axle of the truck and the front surface of the fork apron. Such apparatus is referred to herein as a slope piling apparatus. As used in this specification and in the appended claims, the term "slope piling apparatus" refers to apparatus by which a fork lift truck is capable of lifting a load from, or depositing a load on, a surface which is angled, in a direction only transversely of the truck, relative to a surface on which the truck is disposed.

Generally speaking, this invention provides a slope piling apparatus for a fork lift truck. The fork lift truck for which the slope piling apparatus is provided includes a chassis, a fork apron mounted for controlled vertical movement relative to the chassis, and a pair of load bearing fork members extending from the fork apron. The slope piling apparatus comprises means mounting one of the fork members for guided movement vertically of the fork apron, and controllable means operatively coupled between the fork apron and the one fork member for moving the one fork member vertically relative to the fork apron and the other fork.

The above mentioned and other features of the invention are more fully set forth in the following detailed description of the invention presented in conjunction with the accompanying drawings, wherein:

FIG. 1 is a front elevation view of the fork apron of a fork lift truck equipped with apparatus according to this invention;

FIG. 2 is a side elevation view of the structure shown in FIG. 1;

FIG. 3 is a fragmentary front elevation view of another apparatus according to this invention; and FIG. 4 is a fragmentary front elevation view, with parts broken away, of still another apparatus according to this invention.

FIGURES 1 and 2 show a fork apron 10 mounted for vertical movement to an elevator 11 which is connected to the chassis 12 of a fork lift truck 13. The elevator includes two pairs of channel members 14, 15. Outer channels 15 are pivoted to the truck chassis by pins 16, and inner channels 14 have their upper ends connected together by a bridge (not shown) and are mounted to channels 15 by rollers (not shown) for vertical movement relative to the outer channels. A hydraulic ram 17 is also connected to the chassis at its lower end and is connected to the bridge at its upper end. A length of chain 18 is connected at one end to the fork apron and passes over a pulley (not shown) mounted to the bridge. The other end of the chain is fixed relative to the chassis. The fork apron carries rollers 19 which are engaged between the flanges of the inner channels to mount the apron to the elevator. As ram 17 is extended, the apron is moved vertically an amount double the extension of the ram. The truck chassis is supported on ground 20 by wheels 21.

Fork apron 10 includes upper and lower cross members 22 and 23, respectively, side members 24, and vertical intermediate members 25. A pair of fork members 26, 27 are carried by the fork apron. Fork member 26 has a vertical leg 28 and a horizontal leg 29, the latter leg being the fork tine upon which a load is engaged when the truck is in use. Fork member 26 is secured to the fork apron by a horizontal hanger rod 30 mounted to apron upper member 22 and passed through a hole 31 in the upper end of the vertical leg of the fork member. Fork member 26, therefore, is not movable vertically relative to the fork apron. The rear surface of the fork member bears against the front face of the apron lower member.

A conventional fork lift truck usually has two fork members generally like those described above, both of which are secured to a fork apron in the same manner that fork member 26 is secured to apron 10, or in an equivalent manner. Those skilled in the art, however, will readily appreciate that the manner in which fork member 26 is connected to apron 10 is not a part of this invention, and is described above merely for the purpose of a complete explanation of the invention.

Fork member 27, however, is mounted to the fork apron for movement vertically relative to the apron. This fork member has a vertical leg 32 and a horizontal leg or tine 33 like fork member 26. The upper rear portion of vertical leg 32 defines a boss 34 through which is formed a vertically elongated slot 35 extending parallel to the front surface of the leg. Hanger bar 30 passes through the slot and cooperates with the slot to guide the fork member in vertical movement relative to the apron.

The slope piling apparatus also includes means for moving fork member 27 vertically relative to the fork apron. A hydraulic ram assembly 36 has one end pivotally connected to lower apron member 23 and its other end disposed between and pivotally connected to a pair of lugs 37 secured to the rear side of vertical fork member leg 32 adjacent the lower end of boss 34. The ram preferably is a double acting ram and is operated by hydraulic fluid supplied to the ram assembly through ducts 38 and 39. The nature of fluid flow through the ducts is controlled by the operator of the truck, thereby controlling the operation of the ram. It will be readily apparent to those skilled in the art that mechanisms different from that described, for example, a jackscrew, may be used to move the fork member vertically relative to the fork apron.

FIGURE 3 illustrates another form which structure according to this invention may take. A fork member 40 has a vertical leg 41 and a horizontal leg or load bearing tine (not shown). The upper rear portion of the vertical leg defines a boss (not shown in FIG. 3 but similar to boss 34 shown in FIG. 2 as a part of fork member 27) through which extends a vertically elongated slot 42. The slot transverses the boss parallel to the front surface of the fork member vertical leg. A horizontal hanger bar 43 extends through slot 41 and has its ends supported in a pair of vertical members 44 in a fork apron 45. The fork apron also includes an upper transverse member 46 to which vertical members 44 are connected. The upper transverse member of the fork apron has an aperture 47 formed through it above the fork member. The aperture is large enough to permit the upper end of the fork member vertical leg to be moved through it. Aperture 47, slot 42 and hanger bar 43 cooperate with each other to guide the fork member in vertical movement relative to the fork apron.

An elongated vertical notch 48 is formed in the upper end of fork member vertical leg 41 and extends from front to back of the leg. A hydraulic ram assembly 49 is disposed in the notch and has one end secured to the fork member. The other end of the ram assembly is secured to a sleeve 50 which journals the hanger bar in notch 48. The ram is operated to move the fork member upwardly and downwardly relative to apron 45. Motive fluid is supplied to the ram assembly through ducts (not shown) which connect the ram assembly to a suitable control at the truck operator's station.

FIGURE 4 shows yet another structural arrangement of slope piling apparatus according to this invention. Fork apron 52 includes a transverse upper member 53, a pair of vertical members 54 secured to the upper member, and a cross member 55 disposed below the upper member and extending between and secured to the vertical members. A fork member 56 has a vertical leg 57 and a horizontal leg or tine (not shown). The upper end of the fork member vertical leg has a hole 58 formed through it from side to side of the leg parallel to the forward surface of the leg. The hole is horizontal and receives a hanger rod 59, the ends of which extend laterally of the fork member. The ends of the hanger rod are slidably received on respective ones of a pair of vertically elongated slots 60 formed through the apron vertical members adjacent the apron upper member. The hanger rod and slots 60 cooperate to guide the fork member in vertical movement relative to the fork apron.

A hydraulic ram assembly 61 is coupled between the fork apron and the hanger rod. One end of the ram assembly, preferably cylinder 62, is secured to apron cross member 55. The other end of the ram assembly, preferably the outer end of piston 63, is connected to a yoke member 64 which extends from adjacent one side of the fork member vertical leg around behind the leg to the other side of the fork member as shown in FIG. 4. The ends of the yoke member are secured to respective ones of a pair of sleeves 65 which journal hanger rod 59 between the fork member and apron vertical members 54. Operation of the ram assembly is produced by hydraulic fluid supplied to the ram assembly through supply ducts 66 and 67 at the control of the operator of the truck.

Preferably the apron cross member defines therein a forwardly opening notch 68 which has a width slightly greater than the width of the fork member vertical leg. Notch 68 provides a further guide mechanism for the fork member as it is moved vertically relative to the fork apron in response to controlled operation of ram assembly 61.

The utility of slope piling apparatus according to this invention is apparent from the following description of its operation. Let it be assumed that the fork lift truck is supported on a horizontal surface such as ground 20, and that fork member 27 (or fork members 40 or 56) is positioned so that its horizontal leg is disposed in the same horizontal plane as the horizontal leg of fork member 26. This is the usual position of the vertically movable fork member. Let it also be assumed that the operator of the truck desires to engage the fork tines under a pallet upon which a load is supported so that the loaded pallet can be lifted and moved by the truck, but that the pallet is resting on a surface which is inclined to the horizontal across the truck at an angle A (see FIG. 1), which is of such magnitude that both forks cannot be engaged under or within the pallet. If the truck were moved forward in an attempt to engage the forks with the pallet, one or the other or both the fork members would engage the pallet structure, the load on the pallet, or the structure upon which the pallet is supported; such engagement of the forks with any of these things would damage the structure so engaged and might damage the truck itself. To avoid this result, the operator of the truck merely operates ram 36 (or ram 49 or 61) to raise or lower the movable fork member an amount sufficient to locate both fork members in a plane parallel to the surface on which the pallet is supported; vertical correspondence of these planes can be achieved by raising or lowering the fork apron. The forks can then be engaged with the pallet with ease, and the pallet can then be lifted and placed in a horizontal condition by returning the movable fork member to its normal position.

If a load supported on the fork members is to be deposited on a surface which is inclined across the truck relative to the surface on which the truck is supported, the process described above can be reversed. It is preferred that the forks be placed in a plane parallel to the surface upon which the load is to be deposited before the apron is lowered so that the weight of the load will be uniformly distributed over the receiving structure as the load is deposited. If a conventional fork lift truck having forks fixed vertically relative to the fork apron were used in the situation described, the forks could not be withdrawn from under the load without damage to the load, to the load receiving structure, or to the forks.

As indicated above, the vertically movable fork member in slope piling apparatus according to this invention normally is positioned at the midpoint of its range of vertical movement relative to the fork apron; the structure for moving and for guiding the movable fork member is arranged so that the tine of the movable fork member is then disposed in the same horizontal plane as the tine of the other fork member, assuming the truck itself is horizontal. Such a normal position of the movable fork member enables the fork to be moved either up or down as required. This normal position of the movable fork member also means that only a single movable fork is required to provide a truck capable of lifting or depositing loads on surfaces inclined either way across the truck relative to the surface on which the truck itself is located. Obviously, however, the truck could be provided with two sets of apparatus according to the teachings of the foregoing description without departing from the scope of this invention.

The invention has been described above in the context of specific types of mechanisms and structural arrangements. Workers skilled in the art to which the invention relates will recognize that modifications and alterations may be made in the mechanisms and structures described without departing from the spirit of the invention. Accordingly, the foregoing description is not to be considered as limiting the scope of this invention.

What is claimed is:

1. Slope piling apparatus for a fork lift truck having a fork apron extending transversely of the length of the truck and mounted for controlled vertical movement relative to the chassis of the truck and a pair of load bearing fork members carried by the apron and extending forwardly of the chassis from the apron, one of the fork members having a vertical leg and a horizontal leg, the apparatus comprising means mounting the vertical leg of the one fork member to the fork apron for guided movement vertically relative to the other fork member including a horizontal hanger bar aligned perpendicular to the one fork horizontal leg and mounted on the fork apron and engageable with the vertical leg of the one fork member to guide said fork vertically along a substantially linear path, controllable power means coupled to the hanger bar and said vertical leg for moving the one fork member vertically along said path relative to the hanger bar.

2. In a fork lift truck having a chassis, an elevator mounted to the chassis, a fork apron mounted to the elevator for vertical movement relative to the chassis, and a first fork member mounted to the fork apron and secured from vertical movement relative to the apron, the first fork member extending substantially horizontally from the apron, the improvement comprising a second fork member having a vertical leg and a horizontal leg disposed substantially parallel to the first fork member, the upper rear portion of the vertical leg defining a boss, a vertically extended slot extending horizontally through the boss, a hanger bar passed through the slot and secured laterally of the vertical leg to the fork apron for mounting the second fork member to the apron for movement vertically relative to the apron, and a vertically oriented extensible ram connected between the vertical leg and the fork apron operable for moving the second fork member vertically of the fork apron.

3. In a fork lift truck having a chassis, an elevator mounted to the chassis, a fork apron mounted to the elevator for vertical movement relative to the chassis, and a first fork member mounted to the fork apron and secured from vertical movement relative to the apron, the first fork member extending substantially horizontally from the apron, the improvement comprising a second fork member having a vertical leg and a horizontal leg disposed substantially parallel to the first fork member, the upper rear portion of the vertical leg defining a boss, a vertically extended slot extending horizontally through the boss, a hanger bar passed through the slot and secured laterally of the vertical leg to the fork apron for mounting the second fork member to the apron for movement vertically relative to the apron, the vertical leg defining an upwardly open notch in its upper end, and a vertically oriented extensible ram disposed in the notch and connected between the hanger bar and the fork member at the bottom of the notch.

References Cited

UNITED STATES PATENTS

| | | | |
|---|---|---|---|
| 2,339,120 | 1/1944 | Ulinski | 214—731 |
| 2,628,734 | 2/1953 | Jannsen | 214—750 |
| 2,958,436 | 11/1960 | Skutle et al. | 214—731 |
| 3,164,405 | 1/1965 | Lull | 214—731 |
| 3,235,108 | 2/1966 | Drakulich | 214—731 |
| 2,339,120 | 1/1944 | Ulinski | 214—731 |
| 3,002,638 | 10/1961 | Needy | 214—132 |
| 3,225,949 | 12/1965 | Erickson | 214—660 |
| 3,327,879 | 6/1967 | Lull | 214—767 |

GERALD M. FORLENZA, *Primary Examiner.*

R. B. JOHNSON, *Assistant Examiner.*

U.S. Cl. X.R.

214—700